United States Patent
Kelnhofer et al.

(10) Patent No.: US 9,085,368 B2
(45) Date of Patent: Jul. 21, 2015

(54) SYSTEM AND METHOD FOR AIR CONDITIONING AN AIRCRAFT CABIN WITH IMPROVED COOLING CAPACITY

(75) Inventors: Jürgen Kelnhofer, Jork (DE); Dariusz Krakowski, Buxtehude (DE); Ahmet Kayihan Kiryaman, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 1118 days.

(21) Appl. No.: 13/124,719

(22) PCT Filed: Oct. 13, 2009

(86) PCT No.: PCT/EP2009/007350
§ 371 (c)(1), (2), (4) Date: May 17, 2011

(87) PCT Pub. No.: WO2010/049060
PCT Pub. Date: May 6, 2010

(65) Prior Publication Data
US 2011/0237173 A1 Sep. 29, 2011

Related U.S. Application Data

(60) Provisional application No. 61/109,336, filed on Oct. 29, 2008.

(30) Foreign Application Priority Data

Oct. 29, 2008 (DE) .......................... 10 2008 053 668

(51) Int. Cl.
B64D 13/08 (2006.01)
B64D 13/06 (2006.01)

(52) U.S. Cl.
CPC ........ B64D 13/08 (2013.01); *B64D 2013/0655* (2013.01); *B64D 2013/0688* (2013.01)

(58) Field of Classification Search
CPC .. B64D 13/06; B64D 13/08; B64D 2013/064; B64D 2013/0655; B64D 2013/0688
USPC ............................... 454/70, 71, 72, 73, 74, 76
See application file for complete search history.

(56) References Cited

U.S. PATENT DOCUMENTS

| 5,086,622 A | 2/1992 | Warner |
| 5,545,084 A | 8/1996 | Fischer et al. |
| 5,890,957 A | 4/1999 | Scherer et al. |
| 5,934,083 A * | 8/1999 | Scherer et al. ................... 62/79 |
| 2007/0267060 A1 | 11/2007 | Scherer et al. |
| 2009/0095004 A1 | 4/2009 | Kelnhofer et al. |

FOREIGN PATENT DOCUMENTS

| CN | 1060270 | 4/1992 |
| CN | 1993265 | 7/2007 |
| CN | 101005987 | 7/2007 |

OTHER PUBLICATIONS

Chinese SIPO, Office Action for corresponding Chinese application, Nov. 1, 2012.
Chinese SIPO, Decision of Rejection for corresponding Chinese application, Dec. 30, 2013.
European Patent Office, International Search Report, Form PCT/ISA/210 (3 pgs.), Form PCT/ISA/220 (3 pgs.), and Form PCT/ISA/237 (5 pgs.), Apr. 7, 2010.

* cited by examiner

*Primary Examiner* — Gregory Huson
*Assistant Examiner* — Dana Tighe
(74) *Attorney, Agent, or Firm* — Wood, Herron & Evans, LLP

(57) ABSTRACT

A system for air conditioning an aircraft cabin includes an air conditioning unit connected to a central mixer in order to supply the central mixer with air at a desired low temperature. A first recirculation system is designed to remove exhaust air from a first aircraft cabin region and is connected to the central mixer in order to lead the exhaust air into the central mixer. A second recirculation system is designed to remove exhaust air from a second aircraft cabin region and is connected to first and second local mixers in order to lead the exhaust air into the local mixers, the local mixers also receiving mixed air flow from the central mixer. The second recirculation system includes a cooling unit which is designed to cool the recirculation air removed from the second aircraft cabin region before delivery to the first and second local mixers.

6 Claims, 5 Drawing Sheets

US 9,085,368 B2

SYSTEM AND METHOD FOR AIR CONDITIONING AN AIRCRAFT CABIN WITH IMPROVED COOLING CAPACITY

CROSS-REFERENCE TO RELATED APPLICATIONS

This application claims priority to PCT Application No. PCT/EP2009/007350, filed on Oct. 13, 2009, under Section 371, which claims priority to German Application No. 10 2008 053 668.7 and U.S. Provisional Application No. 61/109,336, both filed on Oct. 29, 2008.

TECHNICAL FIELD

The present invention relates to a system and a method for air conditioning an aircraft cabin which deliver an improved cooling capacity compared with known systems and methods.

BACKGROUND

The cabin of a modern passenger aircraft is air conditioned usually both when the aircraft is flying and is on the ground by means of the aircraft's own air conditioning system. The air conditioning units of the aircraft air conditioning system, which are arranged, for example, in the wing roots of the aircraft, are supplied with bleed air which is taken from the engine compressors or auxiliary power unit compressors and cooled to a desired low temperature in the air conditioning units. If necessary, the air conditioning units can also deliver warm air for heating the aircraft cabin. The air cooled in the air conditioning units of the aircraft air conditioning system is led into a mixer where it is mixed with recirculation air sucked from the aircraft cabin. The mixed air produced in the mixer and composed of cold fresh air provided by the air conditioning units and of recirculation air sucked from the aircraft cabin is finally led into the aircraft cabin for air conditioning of the aircraft cabin.

In wide-body aircraft, in particular in wide-body aircraft having two passenger decks extending over the entire length of the aircraft, an air conditioning system described, for example, in DE 44 25 871 C1 and comprising two recirculation systems for sucking recirculation air from the aircraft cabin is used at present. A low-pressure recirculation system extracts air from an upper deck region of the cabin, while a high-pressure recirculation system serves to extract air from a middle deck region of the cabin. The recirculation air removed from the middle deck region of the cabin by the high-pressure recirculation system is blown into a central mixer of the aircraft air conditioning system. In contrast, the air sucked from the upper deck region by the low-pressure recirculation system is supplied to local mixers which are fed with premixed air by the central mixer, i.e. an air mixture composed of cold fresh air provided by the air conditioning units and recirculation air from the middle deck region of the cabin. The air mixture, produced in the local mixers, composed of premixed air from the central mixer and recirculation air from the upper deck region of the cabin is finally used for air conditioning the aircraft cabin. In particular, air is led into the middle deck region of the cabin from a local mixer arranged in the region of the middle deck, while air is blown into the upper deck region of the cabin from a local mixer arranged in the region of the upper deck.

In modern passenger aircraft, the design of the aircraft's own air conditioning system is usually adapted to the application-specific cooling requirements. Consequently, in the event of an increased cooling requirement, the cooling capacity of the aircraft air conditioning system must also be correspondingly increased. An increase of the cooling capacity may be achieved by enlarging the air conditioning units. However, enlarged and thus higher-capacity air conditioning units result in additional costs, additional weight and problems with the integration into the limited installation space on board the aircraft. Moreover, since the capacity of the air conditioning units is substantially dependent on the temperature and pressure of the engine bleed air supplied to the air conditioning units, the capacity of the auxiliary power unit compressor, which ensures the supply of the air conditioning units with process air when the aircraft is on the ground, must also be increased. However, an increase of the capacity of the auxiliary power unit compressor results, in turn, in additional costs, additional weight and integration problems, or at least a marked reduction of the service life of the compressor. Finally, an enlargement of the air conditioning units may possibly necessitate adaptations to further aircraft components and systems, such as, for example, the recirculation fans and the duct systems, with the result that additional costs, additional weight and integration problems may arise once again.

SUMMARY

The invention is directed at the object of specifying a system and a method for air conditioning an aircraft cabin which deliver an improved cooling capacity compared with known systems and methods, while avoiding the above-described disadvantages associated with an enlargement of the air conditioning units.

This object is achieved by a system for air conditioning an aircraft cabin having the features described below and a method for air conditioning an aircraft cabin having the features described below.

A system for air conditioning an aircraft cabin according to the invention comprises an air conditioning unit connected to a central mixer in order to supply the central mixer with air at a desired low temperature. The air conditioning unit can be supplied with bleed air at an elevated pressure from the engine compressors or the auxiliary power unit compressors. If desired or required, the air conditioning system according to the invention may also have a plurality of air conditioning units. A first recirculation system of the air conditioning system according to the invention is designed to remove recirculation air from a first aircraft cabin region. The first recirculation system can comprise a plurality of air outlet openings which are arranged in the first aircraft cabin region and are formed, for example, in a side-wall region near the floor or in a floor region of the first aircraft cabin region. The first recirculation system of the air conditioning system according to the invention is furthermore connected to the central mixer in order to lead the recirculation air removed from the first aircraft cabin region into the central mixer.

Furthermore, the air conditioning system according to the invention comprises a second recirculation system which is designed to remove recirculation air from a second aircraft cabin region. Similarly to the first recirculation system, the second recirculation system can also comprise a plurality of air outlet openings which are formed in a side-wall region near the floor or in a floor region of the second aircraft cabin region. In a wide-body aircraft having two passenger decks, the first aircraft cabin region can be, for example, a middle deck region of the aircraft cabin. The second aircraft cabin region can then be, for example, an upper deck region of the cabin. The second recirculation system is connected to a local mixer in order to lead the recirculation air from the second aircraft cabin region into the local mixer. Depending on the design of the system, the air conditioning system according to the invention can also comprise a plurality of local mixers. A system for air conditioning the cabin of a wide-body aircraft having two passenger decks can comprise, for example, a first local mixer arranged in the region of the middle deck and a second local mixer arranged in the region of the upper deck.

The local mixer is connected to the central mixer. The mixed air produced in the central mixer and composed of cold fresh air provided by the air conditioning unit and recirculation air from the first aircraft cabin region can thus be led from the central mixer into the local mixer. In the local mixer, the mixed air supplied from the central mixer is finally also mixed with the recirculation air removed from the second aircraft cabin region, before the mixed air is led from the local mixer into the aircraft cabin. For example, mixed air from a first local mixer arranged in the region of a middle deck can be used to air condition the middle deck region of the aircraft cabin, while mixed air from a local mixer arranged in the region of an upper deck can be employed to air condition the upper deck region of the aircraft cabin.

In the system for air conditioning an aircraft cabin according to the invention, the second recirculation system comprises a cooling unit formed separately from the air conditioning unit or the air conditioning units of the air conditioning system. The cooling unit, in relation to the flow direction of the recirculation air removed from the second aircraft cabin region in the second recirculation system, is arranged upstream of the local mixer and is designed to cool the recirculation air removed from the second aircraft cabin region to a desired temperature. In other words, the cooling unit of the second recirculation system ensures that the recirculation air removed from the second aircraft cabin region is precooled to a desired temperature before it is led into the local mixer.

Through the precooling of the recirculation air from the second aircraft cabin region, the temperature of the air conditioning air leaving the local mixer is efficiently lowered without it being necessary to supply mixed air at a lower temperature from the central mixer to the local mixer for this purpose. In the air conditioning system according to the invention, the temperature of the air conditioning air led out of the local mixer into the aircraft cabin can thus be lowered without it being necessary to increase the cooling capacity of the air conditioning unit or the air conditioning units. The air conditioning system according to the invention thus makes it possible to increase the cooling capacity of the entire system by integration of an additional cooling unit, dimensioned specific to the requirements, into the second recirculation system without it being necessary to enlarge the air conditioning unit or the air conditioning units for this purpose. In the air conditioning system according to the invention, disadvantages, such as additional costs, additional weight and integration problems, typically associated with an enlargement of the air conditioning unit or the air conditioning units can therefore be avoided.

In one embodiment of the air conditioning system according to the invention, the cooling unit is arranged in a central recirculation air removal duct of the second recirculation system, in relation to the flow direction of the recirculation air removed from the second aircraft cabin region in the second recirculation system, upstream of a recirculation fan of the second recirculation system. Alternatively to this, the cooling unit may also be arranged in the central recirculation air removal duct of the second recirculation system, in relation to the flow direction of the recirculation air removed from the second aircraft cabin region in the second recirculation system, downstream of a recirculation fan.

In an alternative embodiment of the air conditioning system according to the invention, the cooling unit is arranged in a first recirculation air distribution duct of the second recirculation system. The first recirculation air distribution duct preferably branches off from the central recirculation air removal duct of the second recirculation system and connects the central recirculation air removal duct to a first local mixer. In the first recirculation air distribution duct, the cooling unit may be arranged, in relation to the flow direction of the recirculation air removed from the second aircraft cabin region in the second recirculation system, upstream of the local mixer.

Furthermore, the cooling unit may also be arranged in a second recirculation air distribution duct of the second recirculation system which connects the central recirculation air removal duct to a second local mixer. In the second recirculation air distribution duct, the cooling unit is preferably arranged, in relation to the flow direction of the recirculation air removed from the second aircraft cabin region in the second recirculation system, upstream of the second local mixer.

If desired or required, the second recirculation system of the air conditioning system according to the invention may also comprise more than one cooling unit. The cooling units may then be arranged in the second recirculation system at the above-described positions, it being possible for two or more cooling units to be arranged one behind the other at one position or for the cooling units to be distributed at different positions in the second recirculation system.

The cooling unit provided in the second recirculation system of the air conditioning system according to the invention may be designed to be supplied with cooling energy by an existing cooling system of the aircraft. For example, the cooling unit may be configured in the form of a heat exchanger to which cooling energy is supplied from an existing cooling system of the aircraft. Suitable cooling systems which supply cooling energy to the cooling unit of the air conditioning system according to the invention are, for example, cooling systems installed in the region of the galley or cooling systems which serve for cooling the aircraft electronics. Alternatively to this, however, the cooling unit provided in the second recirculation system of the air conditioning system according to the invention may also be formed as an independent cooling system which produces cooling energy itself. For example, the cooling unit may be designed in the form of an air chiller.

In a method for air conditioning an aircraft cabin according to the invention, air is produced at a desired low temperature by means of an air conditioning unit. The cold fresh air produced by the air conditioning unit is supplied into a central mixer. Recirculation air is removed from a first aircraft cabin region by means of a first recirculation system. The air removed from the first aircraft cabin region by the first recirculation system is led into the central mixer. Recirculation air is removed from a second aircraft cabin region by means of a second recirculation system. The air removed from the second aircraft cabin region by the second recirculation system is led into a local mixer. Mixed air from the central mixer is supplied to the local mixer. The recirculation air removed from the second aircraft cabin region is cooled to a desired temperature by a cooling unit of the second recirculation system which is formed separately from the air conditioning unit or the air conditioning units of the air conditioning system before it is supplied into the local mixer.

The cooling unit may, as described above, be arranged in a central recirculation air removal duct of the second recirculation system upstream or downstream of a recirculation fan, in a first recirculation air distribution duct of the second recirculation system upstream of a first local mixer or in a second recirculation air distribution duct of the second recirculation system upstream of a second mixer. Furthermore, the cooling unit may, as described above, be supplied with cooling energy by an existing cooling system of the aircraft or be formed as an independent cooling system.

BRIEF DESCRIPTION OF THE DRAWINGS

A preferred embodiment of the invention will now be explained in more detail with the aid of the accompanying schematic drawings, of which.

DETAILED DESCRIPTION

Figure 1:
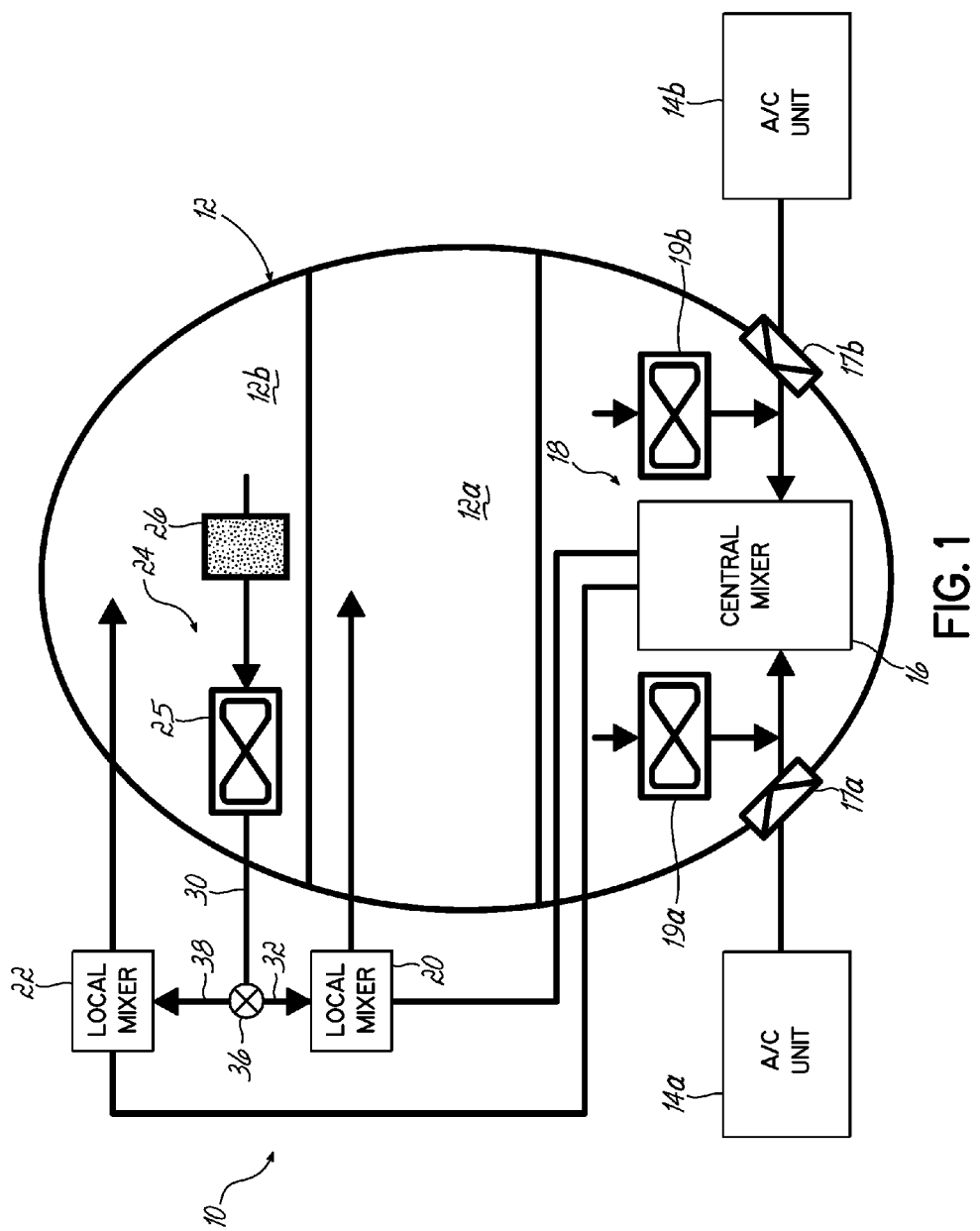
FIG. 1 shows a general illustration of a system for air conditioning an aircraft cabin.

In FIG. 1, a system 10 for air conditioning an aircraft cabin 12 is shown. The aircraft cabin 12 comprises two passenger decks and consequently a first aircraft cabin region 12a formed by a middle deck of the aircraft cabin 12 and a second aircraft cabin region 12b formed by an upper deck of the aircraft cabin 12.

The air conditioning system 10 comprises two air conditioning units 14a, 14b, arranged in the wing root regions of the aircraft, for producing cold fresh air which is supplied to a central mixer 16. Nonreturn valves 17a, 17b prevent a backflow of air from the mixer 16 into the air conditioning units 14a 14b. In the central mixer 16, the cold fresh air produced by the air conditioning units 14a, 14b is mixed with recirculation air which is removed from the first aircraft cabin region 12a, i.e. the middle deck of the aircraft cabin region 12, by a first recirculation system 18. The recirculation air removal from the first aircraft cabin region 12a takes place through air outlet openings arranged in the floor region of the first aircraft cabin region by means of two recirculation fans 19a, 19b.

The mixed air produced in the central mixer 16, i.e. the mixture of cold fresh air and recirculation air conveyed by the first recirculation system 18 from the first aircraft cabin region 12a is supplied to a first and a second local mixer 20, 22. The first local mixer 20 is arranged in the region of the middle deck of the aircraft cabin 12, while the second local mixer 22 is arranged in the region of the upper deck of the aircraft cabin 12. The local mixers 20, 22 are furthermore fed with recirculation air which is sucked from the second aircraft cabin region 12b by a second recirculation system 24. The recirculation air removal from the second aircraft cabin region 12b takes place through air outlet openings arranged in a side-wall region of the second aircraft cabin region 12b by means of a recirculation fan 25. A filter 26, which, in relation to the flow direction of the recirculation air removed from the second aircraft cabin region 12b, is arranged upstream of the recirculation fan 25 in the second recirculation system 24 ensures cleaning of the recirculation air removed from the second aircraft cabin region 12b.

The second recirculation system 24 furthermore comprises a cooling unit 28 which is formed separately from the air conditioning units 14a, 14b and the possible arrangements of which in the second recirculation system 24 are shown in FIGS. 2 to 5. The cooling unit 28 serves to cool the recirculation air removed from the second aircraft cabin region 12b to a desired temperature before it is supplied into the local mixers 20, 22. The cooling unit 28 may be configured, for example, in the form of a heat exchanger and be supplied with cooling energy by an existing cooling system of the aircraft. For example, a cooling system installed in the region of the aircraft galley or an aircraft electronics cooling system may be used to supply the cooling unit 28 with cooling energy. Alternatively to this, however, the cooling unit 28 may also be embodied as an independent cooling system, for example in the form of an air chiller.

Figure 2:
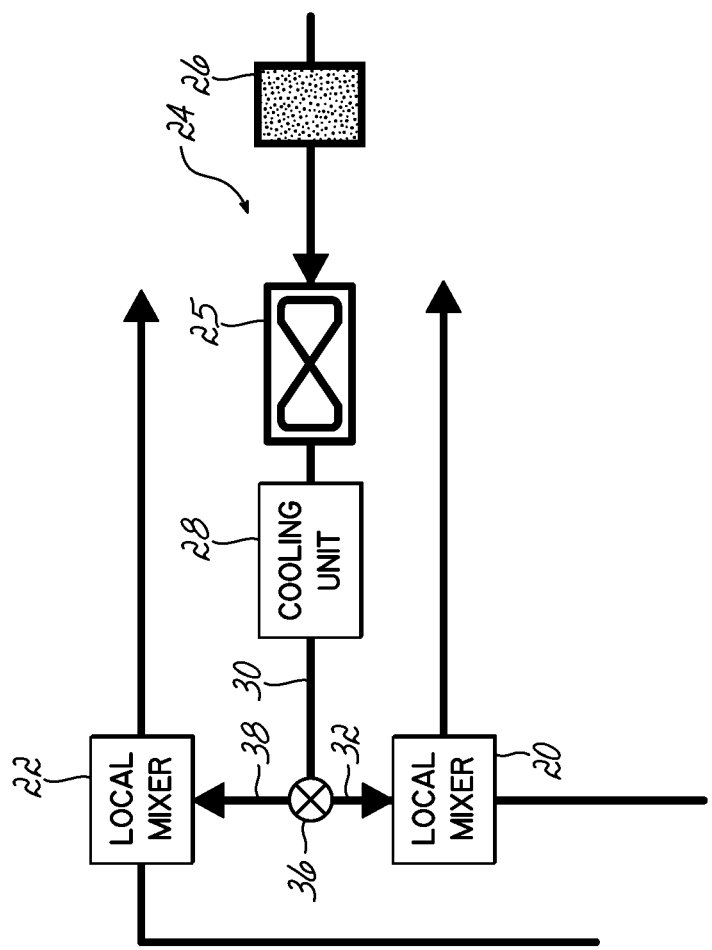
FIG. 2 shows a detail illustration of a first embodiment of an air conditioning system according to the invention.

In the embodiment of an air conditioning system 10 illustrated in FIG. 2, the cooling unit 28 is arranged in a central recirculation air removal duct 30 of the second recirculation system 24. The cooling unit 28, in relation to the flow direction of the recirculation air removed from the second aircraft cabin region 12b in the second recirculation system 24, is arranged downstream of the recirculation fan 25 of the second recirculation system 24.

Figure 3:
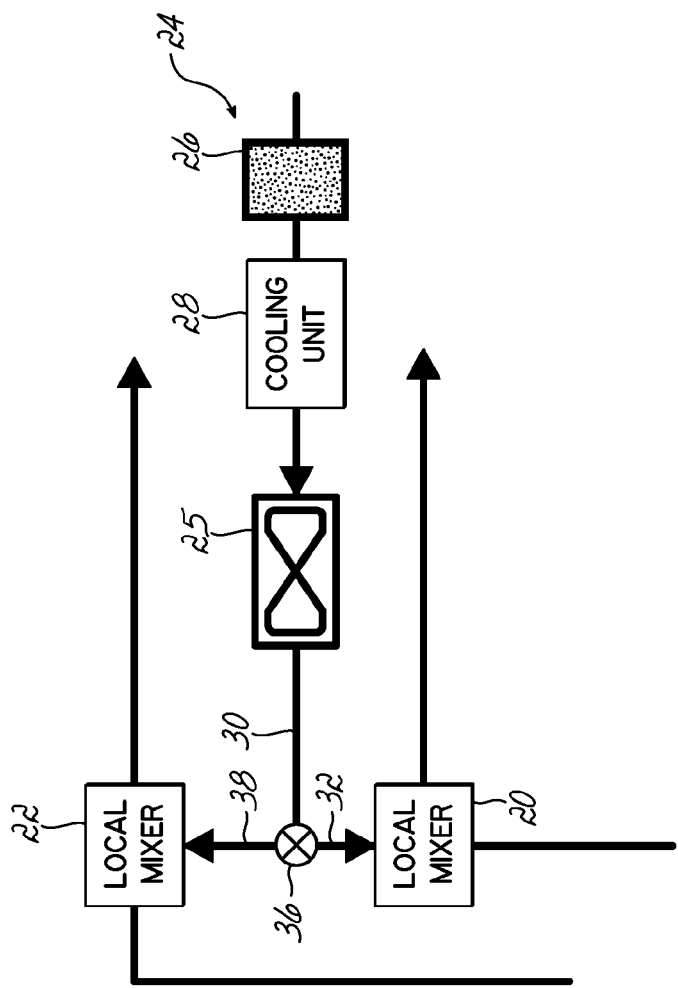
FIG. 3 shows a detail illustration of a second embodiment of an air conditioning system according to the invention.

As shown in FIG. 3, however, the cooling unit 28 may also be arranged in the central recirculation air removal duct 30 of the second recirculation system 24 upstream of the recirculation fan 25. In the arrangement shown in FIG. 3, the cooling unit 28 is positioned downstream of the filter 26. Alternatively to this, however, the cooling unit 28 may also be arranged upstream of the filter 26.

Figure 4:
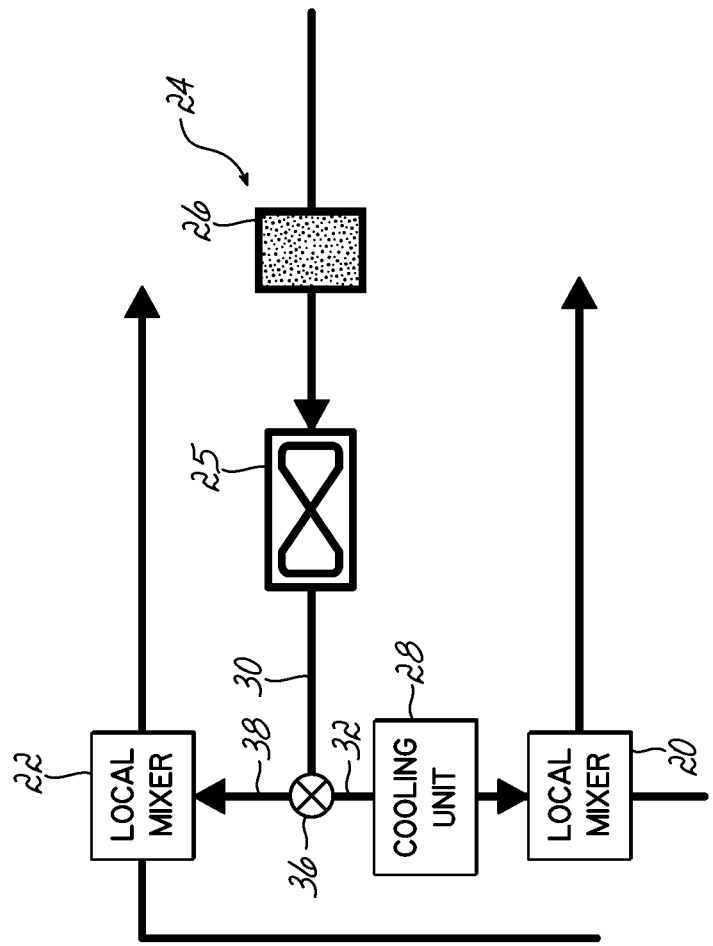
FIG. 4 shows a detail illustration of a third embodiment of an air conditioning system according to the invention.

In the embodiment of an air conditioning system 10 shown in FIG. 4, the cooling unit 28 is arranged in a first recirculation air distribution duct 32 of the second recirculation system 24 which connects the central recirculation air removal duct 30 to the first local mixer 20. In the first recirculation air distribution duct 32, the cooling unit 28, in relation to the flow direction of the recirculation air removed from the second aircraft cabin region 12b in the second recirculation system 24, is arranged downstream of a connection point 36 of the central recirculation air removal duct 30 to the first recirculation air distribution duct 32 and upstream of the first local mixer 20.

Figure 5:
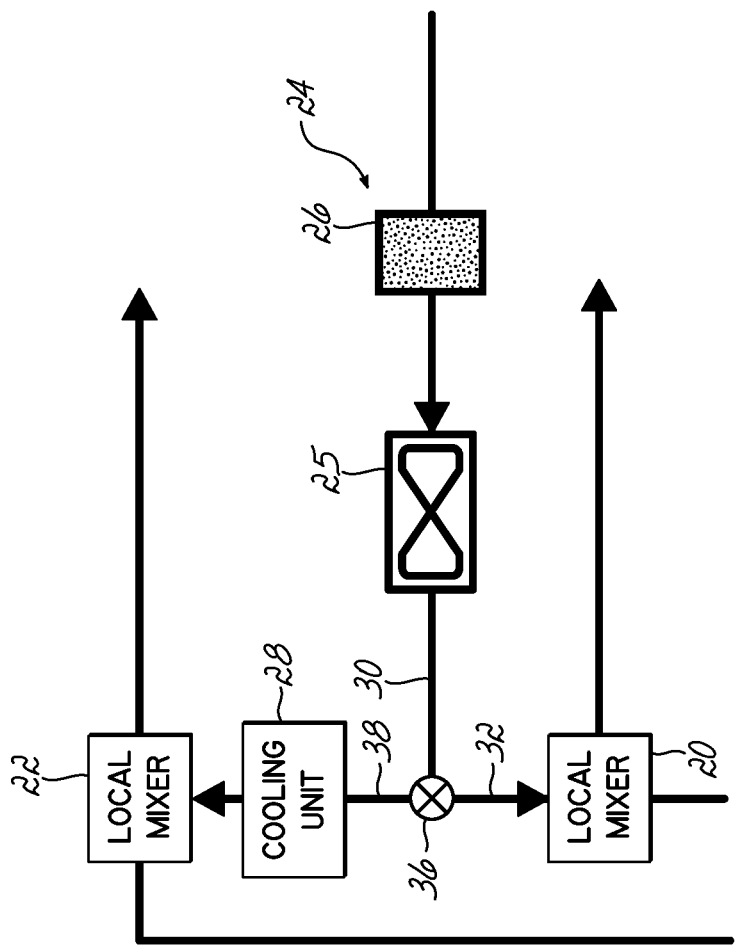
FIG. 5 shows a detail illustration of a fourth embodiment of an air conditioning system according to the invention.

Finally, FIG. 5 shows a further alternative embodiment of an air conditioning system 10, in which the cooling unit 28 is arranged in a second recirculation air distribution duct 38 which connects the central recirculation air removal duct 30 to the second local mixer 22. The cooling unit 28 in the second recirculation air distribution duct 38, in relation to the flow direction of the recirculation air removed from the second aircraft cabin region 12b in the second recirculation system 24, is arranged downstream of a connection point 36 of the central recirculation air removal duct 30 to the second recirculation air distribution duct 38 and upstream of the second local mixer 22.

What is claimed is:

1. A system for air conditioning an aircraft cabin in an aircraft, the system comprising:

a central mixer and first and second local mixers, the first and second local mixers being formed separate from each other and being positioned at different locations in the aircraft, an air conditioning unit connected to the central mixer in order to supply the central mixer with air at a desired low temperature, a first recirculation system which is designed to remove recirculation air from a first aircraft cabin region and which is connected to the central mixer in order to lead the recirculation air from the first aircraft cabin region into the central mixer, and a second recirculation system which is designed to remove recirculation air from a second aircraft cabin region and which is connected to the first local mixer and the second local mixer in order to lead the recirculation air from the second aircraft cabin region into the first local mixer and the second local mixer, the first and second local mixers each being connected to the central mixer in order to supply mixed air from the central mixer into the first and second local mixers, the second recirculation system further comprising:

a central recirculation air removal duct connected to the second aircraft cabin region, a first recirculation air distribution duct which connects the central recirculation air removal duct to the first local mixer, a second recirculation air distribution duct which connects the central recirculation air removal duct to the second local mixer, and at least one cooling unit which is formed separate from the air conditioning unit and which is designed to cool the recirculation air removed from the second aircraft cabin region to a desired temperature, wherein the at least one cooling unit is arranged in at least one of:

the first recirculation air distribution duct, in relation to the flow direction of the recirculation air removed from the second aircraft cabin region in the second recirculation system, upstream of the first local mixer, and the second recirculation air distribution duct, in relation to the flow direction of the recirculation air removed from the second aircraft cabin region in the second recirculation system, upstream of the second local mixer.

2. The system according to claim 1, wherein the at least one cooling unit is at least one of:
designed to be supplied with cooling energy by an existing cooling system of the aircraft, and
formed as an independent cooling system.

3. The system according to claim 1, wherein the at least one cooling unit includes first and second cooling units, the first cooling unit being arranged in the first recirculation air distribution duct, and the second cooling unit being arranged in the second recirculation air distribution duct, thereby providing independent temperature control for recirculation air supplied to each of the first and second local mixers.

4. A method for air conditioning an aircraft cabin in an aircraft, the method comprising:
producing air at a desired low temperature by an air conditioning unit,
supplying the air produced by the air conditioning unit into a central mixer,
removing recirculation air from a first aircraft cabin region by a first recirculation system,
leading the recirculation air removed from the first aircraft cabin region by the first recirculation system into the central mixer,
removing recirculation air from a second aircraft cabin region by a second recirculation system,
leading the recirculation air removed from the second aircraft cabin region by the second recirculation system into a first local mixer and a second local mixer, with the first and second local mixers being formed separate from each other and positioned at different locations in the aircraft, wherein the recirculation air removed from the second aircraft cabin region is supplied into the first local mixer via a central recirculation air removal duct connected to the second aircraft cabin region and then via a first recirculation air distribution duct which connects the central recirculation air removal duct with the first local mixer, and wherein the recirculation air removed from the second aircraft cabin region is supplied into the second local mixer via the central recirculation air removal duct and then via a second recirculation air distribution duct which connects the central recirculation air removal duct with the second local mixer,
supplying mixed air from the central mixer into the first and second local mixers, and
cooling the recirculation air removed from the second aircraft cabin region to a desired temperature by at least one cooling unit of the second recirculation system before it is supplied into the first and/or the second local mixer, the cooling unit being formed separate from the air conditioning unit and being arranged in at least one of:
the first recirculation air distribution duct, in relation to the flow direction of the recirculation air removed from the second aircraft cabin region in the second recirculation system, upstream of the first local mixer, and
the second recirculation air distribution duct, in relation to the flow direction of the recirculation air removed from the second aircraft cabin region in the second recirculation system, upstream of the second local mixer.

5. The method according to claim 4, wherein the at least one cooling unit is at least one of:
supplied with cooling energy by an existing cooling system of the aircraft, and
formed as an independent cooling system.

6. The method according to claim 4, wherein cooling the recirculation air removed from the second aircraft cabin region is performed by first and second cooling units, the first cooling unit being arranged in the first recirculation air distribution duct, and the second cooling unit being arranged in the second recirculation air distribution duct, thereby providing independent temperature control for recirculation air supplied to each of the first and second local mixers.

* * * * *